United States Patent
Yoshie

(10) Patent No.: US 6,731,698 B1
(45) Date of Patent: May 4, 2004

(54) QUADRATURE DEMODULATION CIRCUIT CAPABLE FOR CANCELING OFFSET

(75) Inventor: Kazuaki Yoshie, Gunma-ken (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/534,426

(22) Filed: Mar. 23, 2000

(30) Foreign Application Priority Data

Mar. 25, 1999 (JP) .......................................... 11-081787

(51) Int. Cl.[7] .................................................. H03D 3/24
(52) U.S. Cl. ....................... 375/327; 375/376; 329/325; 329/307
(58) Field of Search ................................ 375/316, 319, 375/325, 326, 327, 328, 344, 346, 348, 350, 351, 371, 375, 376, 362, 364; 455/295, 296, 309, 311, 304, 312, 317, 337, 260, 265; 329/325, 307

(56) References Cited

U.S. PATENT DOCUMENTS

| | | | | |
|---|---|---|---|---|
| 5,128,626 A | * | 7/1992 | Iwasaki | ...................... 329/307 |
| 5,579,346 A | * | 11/1996 | Kanzaki | ...................... 375/344 |
| 5,610,954 A | * | 3/1997 | Miyashita et al. | .......... 375/375 |
| 5,629,960 A | | 5/1997 | Dutkiewicz et al. | |
| 5,629,962 A | * | 5/1997 | Okumura et al. | ........... 375/376 |
| 5,719,908 A | | 2/1998 | Greeff et al. | |
| 5,732,109 A | * | 3/1998 | Takahashi | ................... 375/326 |
| 5,832,043 A | * | 11/1998 | Eory | ......................... 375/344 |
| 6,069,524 A | * | 5/2000 | Mycynek et al. | ........... 329/308 |
| 6,115,593 A | * | 9/2000 | Alinikula et al. | .......... 455/324 |
| 6,144,708 A | * | 11/2000 | Maruyama | ................. 375/327 |
| 6,590,950 B1 | * | 7/2003 | Mycynek | .................... 375/376 |

OTHER PUBLICATIONS

European Search Report dated Oct. 29, 2003, Ref. No. REC/P55039/000.

* cited by examiner

Primary Examiner—Khai Tran
Assistant Examiner—Khanh Cong Tran
(74) Attorney, Agent, or Firm—Hogan & Hartson, LLP

(57) ABSTRACT

When a clock reproduction circuit (6) is locked, a phase comparator (9) detects a level difference ΔE between a zero crossing point and a true 0 level. The level difference ΔE represents an offset level and is output as an offset detection signal. After being planarized in the LPF (12), the level difference ΔE is input to adders (14) and (15) so as to cancel a DC offset.

7 Claims, 6 Drawing Sheets

QUADRATURE DEMODULATION CIRCUIT CAPABLE FOR CANCELING OFFSET

BACKGROUND OF THE INVENTION

1. Field of the Invention

The present invention relates to a quadrature demodulation circuit used for digital television broadcasting.

2. Description of Related Art

The technology for supplying digital television broadcasting signals having been practically implemented, commercial digital television broadcasting has begun. Commercial digital television broadcasting can be broadly divided into either broadcasting where digital television signals are transmitted by satellite or broadcasting using terrestrial waves. In the following, satellite digital television broadcasting will be described.

FIG. 5 illustrates a structure of one frame of digital data to be received in a satellite digital broadcasting receiver. One frame of digital data as depicted in FIG. 5 contains 39936 symbols, a symbol as used herein referring to a signal received in synchronization with one clock. The leading end portion of one frame includes a transmission multiple control (TMCC) signal for transmitting control information regarding a slot signal or a transmission system, and a synchronization word signal. The synchronization word signal contains a total of 40 symbols, while the number of symbols in the TMCC and synchronizing word signals totals 192, which are to be transmitted as a BPSK (binary PSK) modulation signal.

After the TMCC signal and the synchronization word signal, data (containing separate tracks such as video, audio, or the like) and carrier clock burst signals are alternately provided. Each data portion contains 203 symbols and each carrier clock burst signal contains 4 symbols. A carrier clock burst signal is a BPSK modulation signal.

A data portion containing 203 symbols and a carrier clock burst signal portion containing 4 symbols constitute one set of data, and 4 sets in succession, ((203+4)×4) symbols, is referred to as one "slot".

Slots are modulated using different types of modulation. The type of modulation used and the order of data transmission are recognized after drawing frequency of the carrier clock has been determined, by detecting a synchronization word, establishing a frame synchronization, and demodulating the TMCC. The modulation types to be used include 8PSK, QPSK (Quadrature PSK), BPSK, or the like.

FIG. 6 illustrates a structure of a satellite digital broadcasting receiver. A digital television signal transmitted from a satellite is received by a tuner 61 where synchronous detection is applied while the frequency is down-converted. A digital modulation signal obtained from the tuner 61 is demodulated in a quadrature demodulation circuit 62 to produce I and Q baseband signals. A PSK demodulation circuit 63 provides various types of PSK demodulation according to the I and Q baseband signals, and an error correction circuit 64 applies error correction to a PSK demodulation signal. The PSK demodulation signal subjected to error correction is decoded into motion image data or audio data in a signal processing circuit 65 according to set protocols such as those of the MPEG1 or MPEG2 system.

FIG. 3 illustrates an example of a quadrature demodulation circuit 62. Multipliers 1 and 2 constituting a quasi synchronous detector applies synchronous detection to a digital television signal to output I and Q signals, which are then converted by AD converters 3 and 4 into digital data and input into a demodulator 5.

The demodulator 5 corrects the I and Q signals such that their vectors enter an ideal state and outputs I and Q baseband signals. The I baseband signal is input to a clock reproduction circuit 6 which reproduces a reproduction clock CK synchronized with the baseband signal by a PLL method. In the clock reproduction circuit 6, a zero crossing point of the baseband signal serving as a reference signal is detected as shown in FIG. 2A, and the frequency of a VOC in the clock reproduction circuit 6 is controlled such that the phase of the zero crossing point and the phase of a rising edge of the reproduction clock CK are synchronized. FIG. 2A indicates that phase synchronization is established between a baseband signal and a reproduction clock.

The AD converters 3 and 4 may output a digital data superposed with a DC offset depending on their performance, and this causes the following problems.

FIG. 4 illustrates a constellation of the QPSK modulation system. In the QPSK system, each point (A, B, C, D) representing a vector of a baseband signal appears in each of four quadrants and the vectors can transit between the points according to data. When a DC offset exists in the AD converters 3 and 4, the vector of a baseband signal does not represent an ideal state by indicating a wrong point according to the amplitude level of the baseband signal. When an offset is generated in the Q baseband signal, for example, an ideal point ○, is shifted to a point ●. For example, the vector of a baseband signal may be shifted to a point A' depending on DC offset. In this case, it is probable that a baseband signal which should be demodulated as a point A may be incorrectly demodulated as a point B depending on the amplitude level of the offset. If the distance between each point on the constellation shown in FIG. 4 is shortened, namely if the distance between each point in a case where a DC offset exists (A'–B', for example) is shorter than that in a case where no DC offset exists (A–B), the noise margin with regard to noise generated in a transmission path is decreased, causing deterioration of a demodulation performance (bit error rate).

In the related art example shown in FIG. 3, in order to cancel a DC offset, a low pass filter for detecting a DC offset and an adder for removing a DC offset are provided between each of the AD converter 3 and 4 and the demodulator 5. Specifically, output data from each AD converter 3, 4 is planarized in each low pass filter to detect a DC offset, which is resultantly cancelled in the adders by subtracting the DC offset.

Such a low pass filter, however, requires a large time constant to detect the DC level, which results in a problem that the circuit scale of the low pass filter is extremely enlarged. Further, it is necessary to operate the low pass filters at a high speed with the same clock as the AD converters 3 and 4 because the low pass filters are coupled after the AD converters 3 and 4, respectively. Although a high speed operation of a large scale circuit such as the low pass filter described above can be implemented using pipeline signal processing, such a pipeline system requires that an additional register be provided.

SUMMARY OF THE INVENTION

The present invention aims to provided a device for effectively canceling a DC offset in a baseband signal.

According to an aspect of the present invention, a DC offset is detected using phase comparison results in a PLL for generating a reproduction clock synchronized with a baseband signal. Thus, it is possible to cancel a DC offset existing in a baseband signal with a simple circuit structure.

A reproduction clock synchronized with a baseband signal is necessary in a demodulation circuit. Because the PLL which generates the reproduction clock is also utilized to detect a DC offset, an extremely simple structure can be used for effective DC offset detection.

BRIEF DESCRIPTION OF THE DRAWINGS

These and other objects of the invention will be explained in the description below, in connection with the accompanying drawings, in which.

DETAILED DESCRIPTION OF THE PREFERRED EMBODIMENT

A preferred embodiment of the present invention will be described in further detail with reference to the accompanying drawings.

Figure 1:
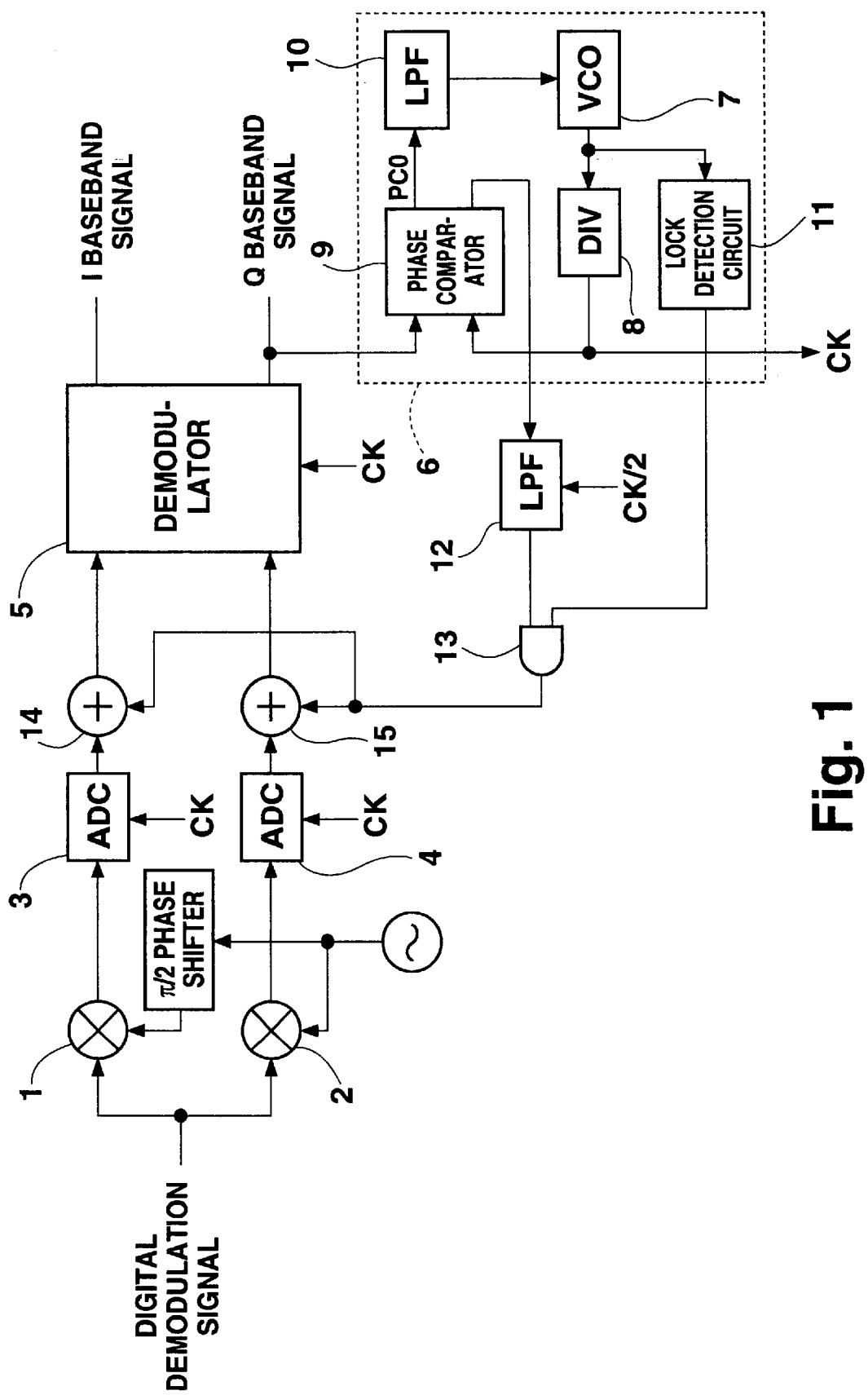
FIG. 1 is a block diagram illustrating a structure of a quadrature demodulation circuit according to an embodiment of the invention.
Figure 3:
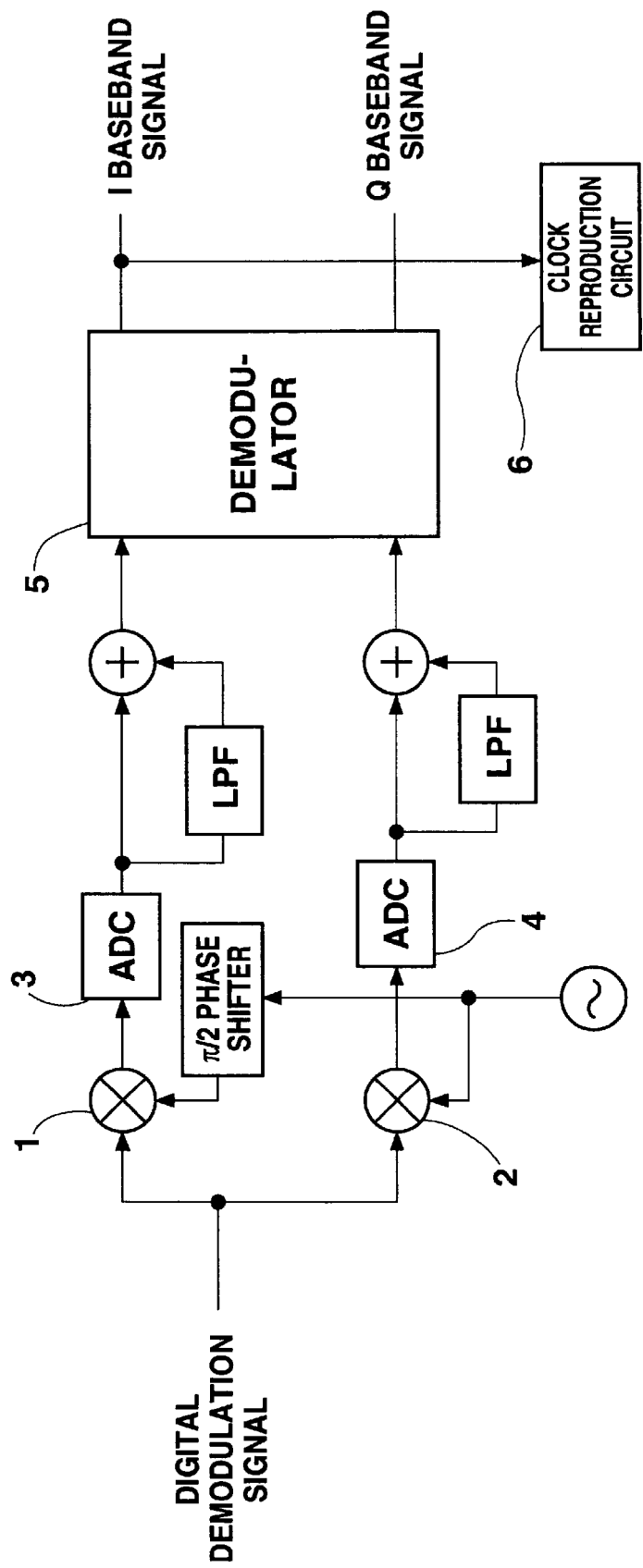
FIG. 3 is a block diagram illustrating a structure of a quadrature demodulation circuit according to a related art.
Figure 4:
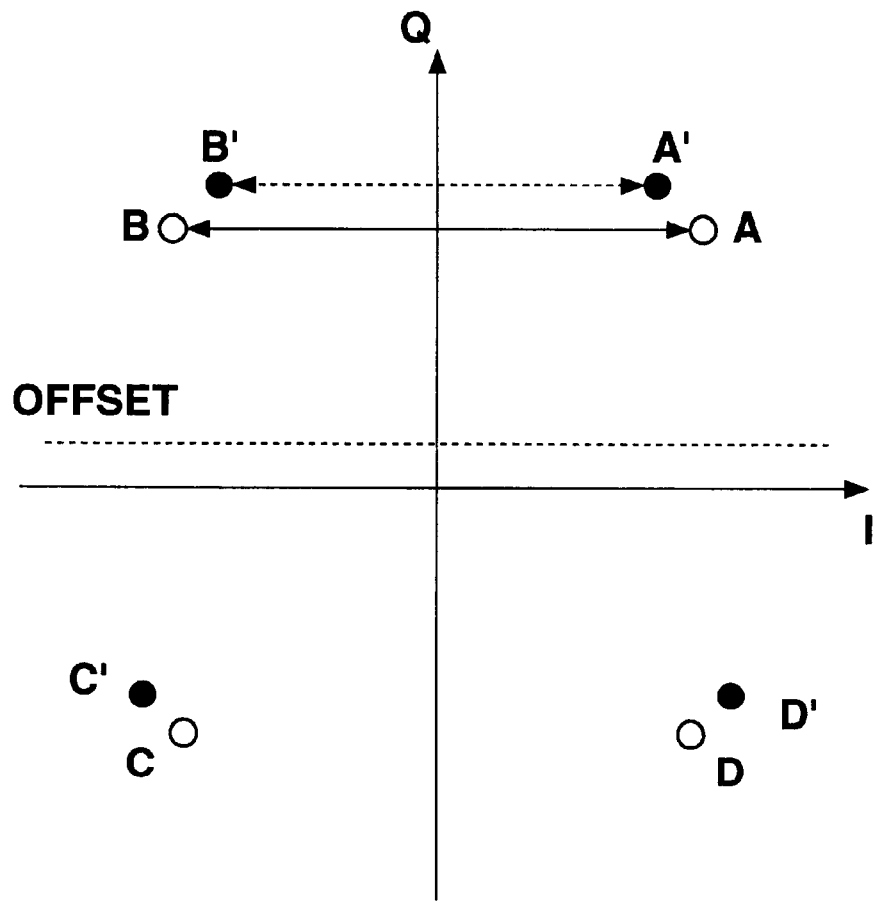
FIG. 4 is a diagram illustrating a constellation of the QPSK.
Figure 5:
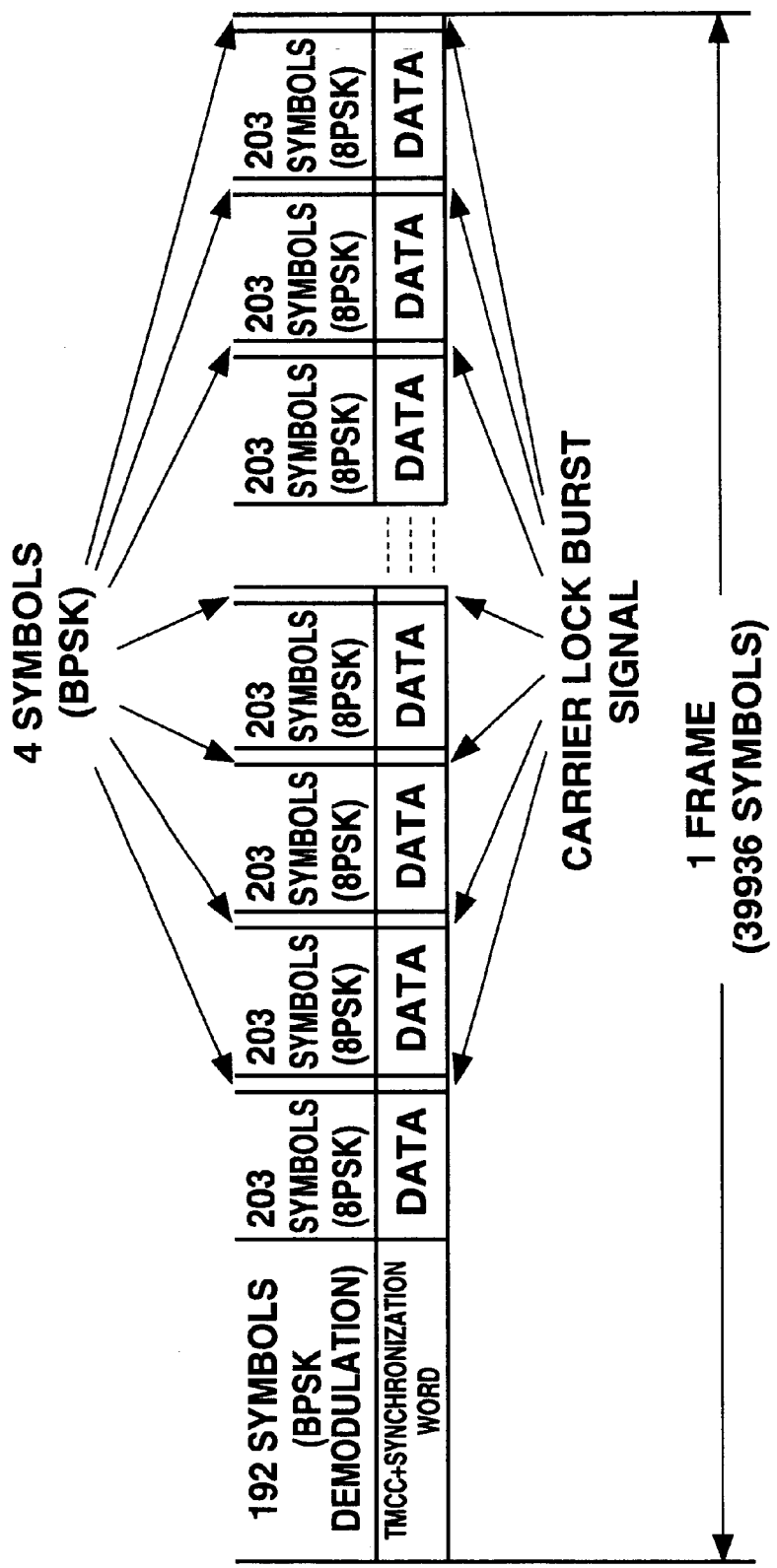
FIG. 5 is a diagram illustrating a data structure of a digital television signal.
Figure 6:
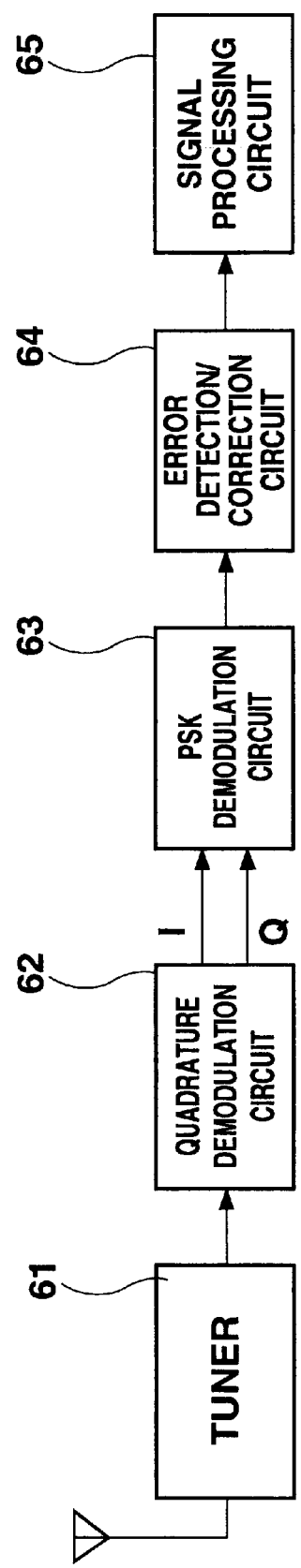
FIG. 6 is a block diagram illustrating a structure of a satellite digital television receiver.

FIG. 1 is a circuit diagram illustrating an embodiment of the present invention in which elements identical to those shown in FIG. 3 are designated by the same numerals and will not be described again.

Referring to FIG. 1, a clock reproduction circuit 6 comprises a voltage controlled oscillator (VCO) 7 whose output frequency is variable, a frequency divider 8 for dividing the frequency of an output signal of the VCO 7, a phase comparator 9 for comparing the phases between a Q baseband signal and an output signal of the frequency divider 8, and a low pass filter (LPF) 19 for planarizing a phase detection signal from the phase comparator 9 and generating a frequency control signal which controls the output frequency of the VCO 7. The clock reproduction circuit 6 further comprises a lock detection circuit 11 which counts the output frequency of the VCO 7 and determines whether the PLL is locked by detecting whether a count value is repeatedly a same value, i.e., a variation of the output frequencies of the VCO 7 becomes sufficiently small.

An LPF 12 operates to delay and planarize an offset detection signal output from the phase comparator 9 so as to stabilize the offset correction loop. A gate circuit 13 allows the offset detection signal to be applied thereto when the clock reproduction circuit 6 is locked. Further, each of adders 14 and 15 cancels an offset output from the AD converter 3 or 4 in accordance with the offset detection signal.

Figure 2A:
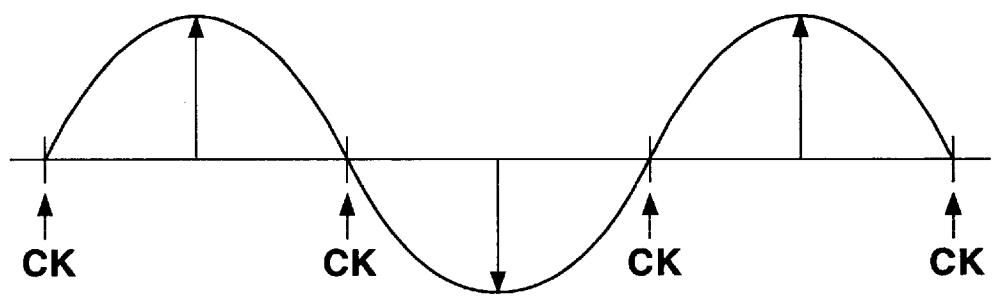
FIGS. 2A, 2B, 2C, and 2D are wave form diagrams for explaining the operation of the clock reproduction circuit shown in FIG. 1.

An example operation of the clock reproduction circuit 6 will be described. The phase comparator 9 outputs a phase detection signal PCO based on a phase difference between a Q baseband signal and an output from the frequency divider 8 (a reproduction clock CK). The phase detection signal PCO, after being planarized in the LPF 10, is input to the VCO 7 as a control signal. The output frequency of the VCO 7 is changed according to a frequency control signal. An output signal from the VCO 7 is subjected to frequency dividing and is once again input to the phase comparator 9 as the reproduction clock CK. A zero crossing point of a Q baseband signal serving as a reference signal is detected as shown in FIG. 2A, and the output frequency of the VCO 7 is controlled such that a phase synchronization is established between this zero crossing point and the rising edge of the reproduction clock CK.

Alternatively, an I baseband signal in place of a Q baseband signal may be supplied to the phase comparator 9.

The phase comparator 8 outputs a phase detection signal PCO and an offset signal. The phase detection signal PCO is output as a baseband level when a reproduction clock rises near the zero crossing point of the baseband signal. When the baseband signal is rising, the phase detection signal PCO is output by not inverting the baseband level, and when the baseband signal is falling, the phase detection signal PCO is output by inverting the baseband level. Specifically, when the phase of the reproduction clock is in advance of the phase of the baseband signal (frequency of the baseband signal<frequency of the reproduction clock CK) as shown in FIG. 2C, the baseband signal level (−ΔE) is negative at the rising of the baseband signal at the zero crossing point of the reproduction clock CK, and, therefore, the output phase detection signal has a negative value. On the other hand, the baseband level is positive (ΔE) at the fall of the baseband signal, and a phase detection signal of a negative level is output by inverting the signal level. Thus, a frequency control signal to be input to the VCO 7 is resultantly of a negative level, such that the output frequency of the VCO 7 is controlled to be lower.

Figure 2B:
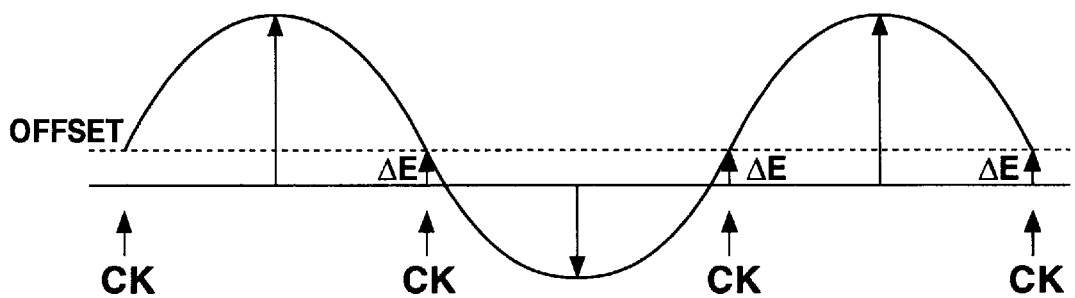
Figure 2C:
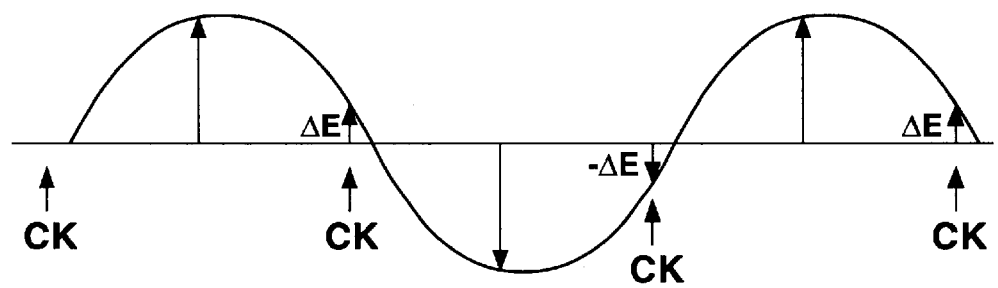
Figure 2D:
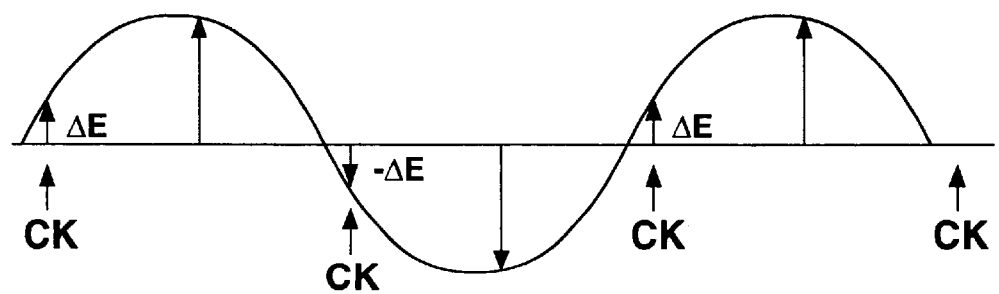

On the other hand, when the phase of the reproduction clock is behind that of the baseband signal (frequency of the baseband signal>frequency of the reproduction clock CK) as shown in FIG. 2D, the baseband signal level is positive at the rising of the baseband signal at the zero crossing point of the reproduction clock CK, and, therefore, the phase detection signal output in this case has a positive value. When the baseband level is negative at the fall of the baseband signal, and a phase detection signal of a positive level is output by inverting the signal level. Thus, a frequency control signal to be input to the VCO 7 is resultantly of a positive level, such that the output frequency of the VCO 7 is controlled to be higher.

FIG. 2B depicts a waveform when the clock reproduction circuit 6 is in a locked state and an offset is generated in a baseband signal. Because the baseband signal as a whole is lifted by an offset, the intermediate value between the negative and positive peaks of the baseband signal is shifted at the offset level. As a result, in the clock reproduction circuit 6, the VCO 7 is controlled such that the phases are synchronized between the rising edge of the reproduction clock and the crossing point of the baseband signal relative to the offset level. In this state, signals with the same positive or negative level ΔE are alternately output as phase detection signals PCO, and therefore the frequency control signal output from the LPF is "0", thereby maintaining the locked state.

The level difference ΔE in the locked state represents the offset level. The level difference ΔE is output as an offset detection signal. The phase comparator 9, which detects the baseband level near the zero crossing point, can thus output an offset detection signal, and no additional circuits are required.

The offset detection signal is planarized by the LPF 12 so as to form a signal for canceling the offset. The output of the LPF 12 is input to the adders 14 and 15 via the AND gate 13. The offset detection being correctly performed when the PLL is locked as described above, the lock detection circuit 11 then outputs a high level signal as a lock signal. The lock signal is input to one terminal of the AND gate 13, while the output of the LPF 12 is input to the other terminal of the AND gate 13. Thus, the output signal from the LPF 12 is allowed into the adders 14 and 15 only when the lock detection circuit 11 generates an output signal, which thereby prevents an inappropriate offset detection signal from being supplied to the adders 14 and 15. In the adders 14 and 15, an output from the LPF 12 is added to the outputs of the AD converters 3 and 4 to thereby cancel the DC offset in the output from the AD converters 3 and 4. The LPF 12, which serves to planarize the offset detection signal, also serves to delay or dull the offset detection signal, to thereby dull the sensitivity of the offset correction loop for stabilization. Because the DC offset can be detected by the phase comparator 9, the LPF 12 is not required to planarize the output from the AD converters 3 and 4 to detect the DC offset as in the related art example. Therefore, the LPF 12 may have a smaller time constant than in the related art example, and the operation clock can be CK/2, thereby eliminating the need for an enlarged circuit.

The lock detection circuit 11 is not limited to the circuit shown in FIG. 1 as long as the circuit can detect the locked state of the PLL. For example, it is possible to employ a circuit for detecting that the output of the LPF 10 is 0, a circuit which counts the output frequency of the frequency divider 8 to detect the locked state by finding no change in the count values during a predetermined period, or the like.

Furthermore, a phase shift of I and Q baseband signals can be detected by comparing the I and Q baseband signals with those of 1 clock before, and the phase lock is determined by detecting the phase shift being 0. It is also possible to detect a phase shift by monitoring the demodulated signal from the demodulator 5 if synchronization data is repeatedly detected from each frame of the demodulated signal.

According to the present invention, because the DC offset can be detected using the phase comparison result obtained in the PLL which generates a clock synchronized with a baseband signal, the DC offset can be cancelled with a simple circuit structure which need not be operated at a high speed.

Further, according to the present invention, a circuit which reproduces a clock synchronized with a baseband signal is used to detect the DC offset, to thereby eliminate the need for adding an extra circuit.

While the preferred embodiment of the present invention has been described using specific terms, such description is for illustrative purposes only, and it is to be understood that changes and variations may be made without departing from the spirit or scope of the appended claims.

What is claimed is:

1. A quadrature demodulation circuit for demodulating a pair of baseband signals from a digital modulation signal, comprising:
    a quasi synchronous detection circuit for providing quasi synchronous detection of said baseband signals from said digital modulation signal;
    AD converters each converting each of said baseband signals into digital data;
    adders each adding output data from each of said AD converters with a DC offset signal; and
    a PLL circuit for generating a reproduction clock synchronized with at least one of said baseband signals;
    wherein said PLL circuit generates said DC offset signal based on a phase relation between said baseband signals and said reproduction clock, and supplies said DC offset signal to said adder; and
    wherein said PLL circuit includes a phase comparator for comparing phases between said baseband signal and said reproduction clock, said phase comparator detecting the level of the baseband signal at the time of rise or fall of said reproduction clock to output the detected level as said DC offset signal.

2. A quadrature demodulation circuit according to claim 1, wherein said PLL circuit further includes:
    a lock detection circuit for detecting a locked state of said PLL circuit; and
    a gate circuit for controlling whether or not said DC offset signal is supplied to said adders based on an output from said lock detection circuit.

3. A quadrature demodulation circuit according to claim 2, further comprising a low pass filter for planarizing and delaying said DC offset signal.

4. A quadrature demodulation circuit according to claim 1, further comprising a low pass filter for planarizing and delaying said DC offset signal.

5. A quadrature demodulation circuit according to claim 4, wherein said low pass filter operates based on a clock having a frequency half that of said reproduction clock.

6. A quadrature demodulation circuit according to claim 1, wherein said PLL circuit outputs said reproduction clock as a clock synchronized with a bit clock contained in said baseband signal.

7. A quadrature demodulation circuit according to claim 1, wherein said quasi synchronous detection circuit provides quadrature detection to said digital modulation signal to obtain said pair of quadrature related baseband signals.

* * * * *